Dec. 27, 1949 J. P. TOMANY 2,492,407
CATALYTIC REACTOR
Filed May 4, 1945 2 Sheets-Sheet 1

INVENTOR.
James P. Tomany
BY
ATTORNEY

Dec. 27, 1949     J. P. TOMANY     2,492,407
CATALYTIC REACTOR
Filed May 4, 1945     2 Sheets-Sheet 2
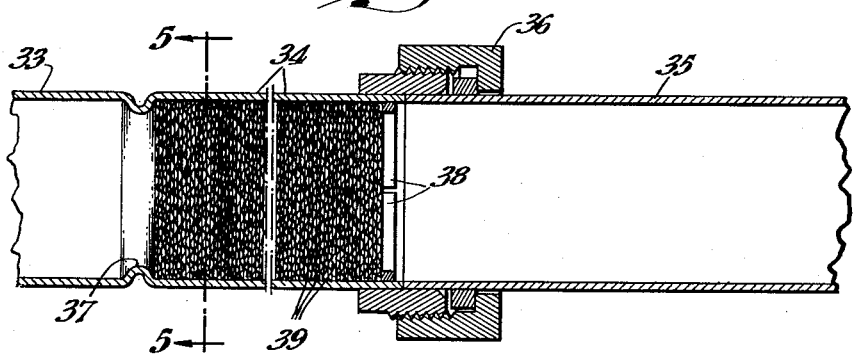
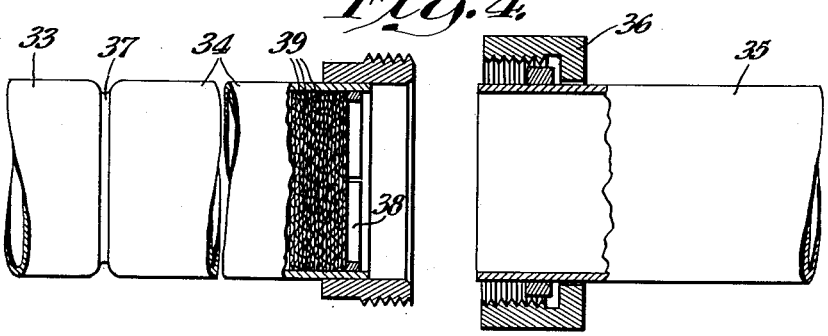
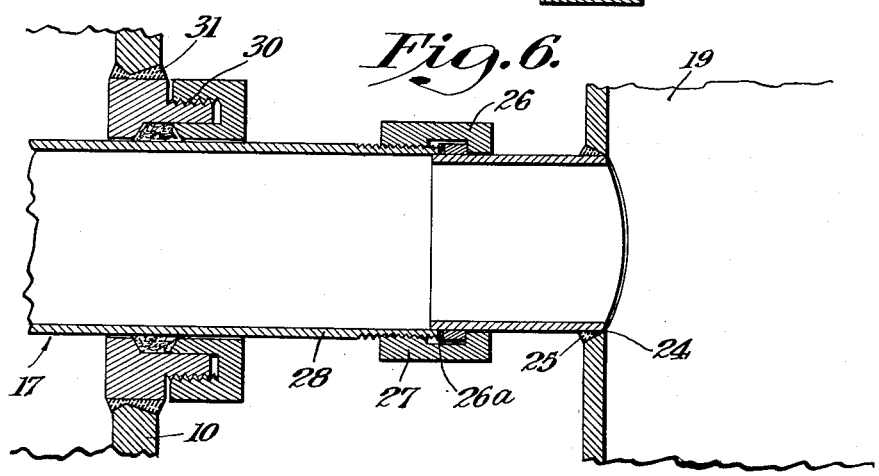
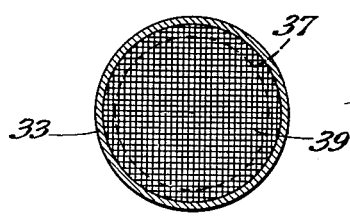
INVENTOR.
James P. Tomany
BY
ATTORNEY Patented Dec. 27, 1949

2,492,407

UNITED STATES PATENT OFFICE 2,492,407

CATALYTIC REACTOR

James P. Tomany, New York, N. Y., assignor to The Lummus Company, New York, N. Y., a corporation of Delaware Application May 4, 1945, Serial No. 591,869

11 Claims. (Cl. 23—288)

This invention relates to catalysis and, in particular, to the provision of new and improved apparatus and method for accomplishing catalytic reactions.

It is an object of this invention to provide a catalytic reactor which is particularly adapted for accomplishing catalytic reaction wherein substantial heat exchange is necessary and/or desirable and which reactor is of simple construction, efficient in operation and readily and conveniently serviced.

It is a further object of this invention to provide such a method wherein a circulating heat exchange or heat transfer medium is utilized to raise to the optimum temperature the medium to be treated prior to its contact with the catalyst, thus eliminating necessity for preheating, and to provide a reactor particularly adapted to the achievement of such method with elimination of the necessity for a preheater.

It is a further object of this invention to provide such a reactor which embodies a new and improved catalyst chamber construction presenting the catalyst directly in the path of the medium to be treated, wherein the catalyst may be changed and/or the quantity or nature thereof varied as desired with ease and convenience, and wherein a plurality of paths are provided for conducting the medium to be treated in plural paths through a body of circulating heat exchange medium, each of the aforesaid paths including a reaction zone, including a catalyst chamber, and wherein the medium to be treated, after being brought to optimum temperature is contacted with catalyst of predetermined type and quantity.

It is a further object of this invention to provide such a method and such apparatus wherein a circulating body of heat exchange medium is utilized, first to heat the incoming medium to be treated to optimum temperature for initiation of the catalytic reaction, and thereafter for heating the incoming medium to be treated to such optimum temperature by transferring thereto heat of the reaction absorbed by said circulating heat exchange medium and transferred by it to the aforesaid incoming medium to be treated.

These and other objects and advantages of the invention will clearly appear from the following description taken with the drawing.

In the drawing:

Fig. 3 is a fragmentary enlarged section of a reactor coil taken substantially on the plane indicated by the line 3—3 in Fig. 2, with the ends of the coil sections connected;

Fig. 4 is a view in elevation, partly broken away, and partly in section, of the structure shown in Fig. 3 with the coil sections disconnected to provide access to the screen catalyst in the catalyst chamber;

Fig. 5 is a section taken substantially on the plane indicated by the line 5—5 in Fig. 3; and Fig. 6 is a fragmentary enlarged section taken substantially on the plane indicated by the line 6—6 in Fig. 2.

Figure 1:
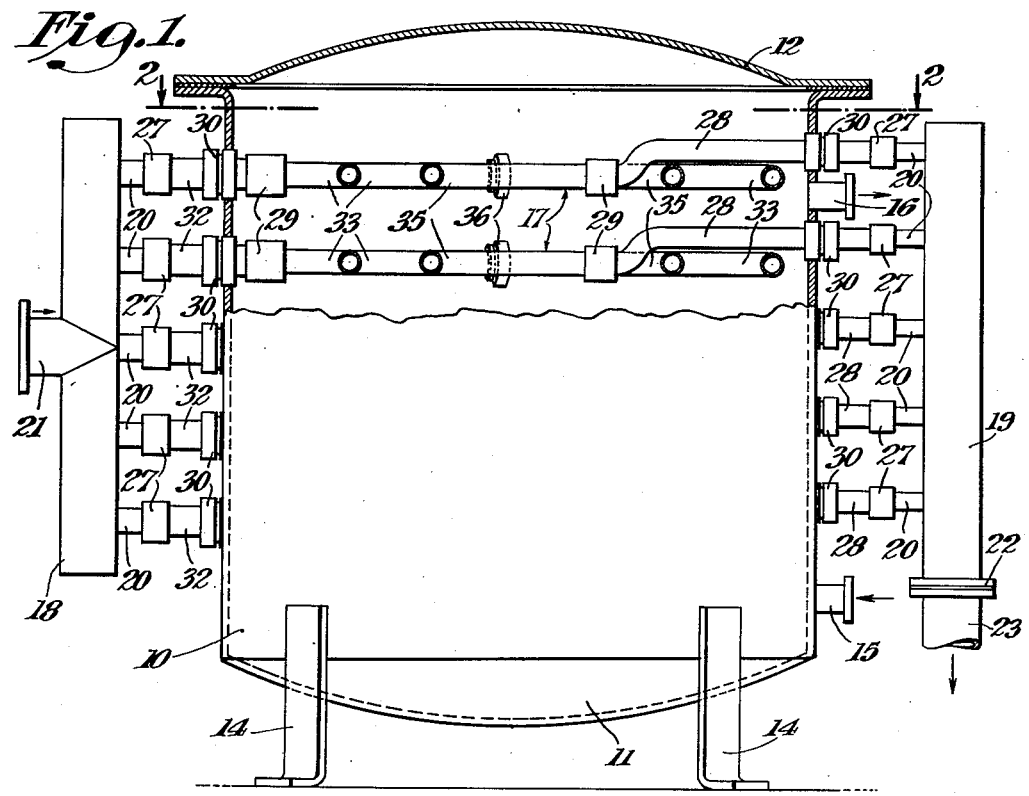
Fig. 1 is a view in elevation, partly broken away, and partly in section, of an illustrative reactor constructed according to the principles of this invention.

Referring to the drawing in detail, the illustrative reactor shown therein comprises a cylindrical container or receptacle having an annular side-wall 10, integral arcuate bottom 11, and cover 12 removably secured thereto in fluid-tight manner by conventional means (not shown), which container is adapted to contain a volume of circulating heat exchange medium or coolant as hereinafter described and which container or receptacle is provided with interior "pancake" type coils through which the medium to be treated is circulated from a common inlet header to a common outlet header.

The container is provided with suitable supports such as legs 14 for supporting it in conventional manner. The heat exchange medium is circulated by means of the heat exchange inlet 15 connected to a suitable source of heat exchange medium and communicating through the side-wall 10 with the lower portion of the interior of the container and a heat exchange outlet 16 communicating with the upper portion of the interior of the container and with a suitable receiving station, or, directly, with the aforesaid source.

The above described coils, each generally designated 17, have common connection with the inlet header 18, which is connected with a suitable source of medium to be treated and with the outlet header 19 which is connected with a suitable collecting station, or means, for receiving the catalytically treated medium.

The inlet header 18 and outlet header 19 both comprise upright cylindrical members provided with a plurality of similar extensions 20. The inlet header 18 is closed at opposite ends and is provided with a centrally disposed inlet connection 21 while the outlet header 19 is closed only at its upper end and is provided at its lower end with a flange 22 adapting it for connection with a suitable conduit 23 leading to the aforesaid collecting station.

The details of the connection of the extensions 20 with the outlet header 19 are illustrated in Fig. 6 and, as stated above, the extensions 20 are connected with the header 18 in similar manner.

Figure 2:
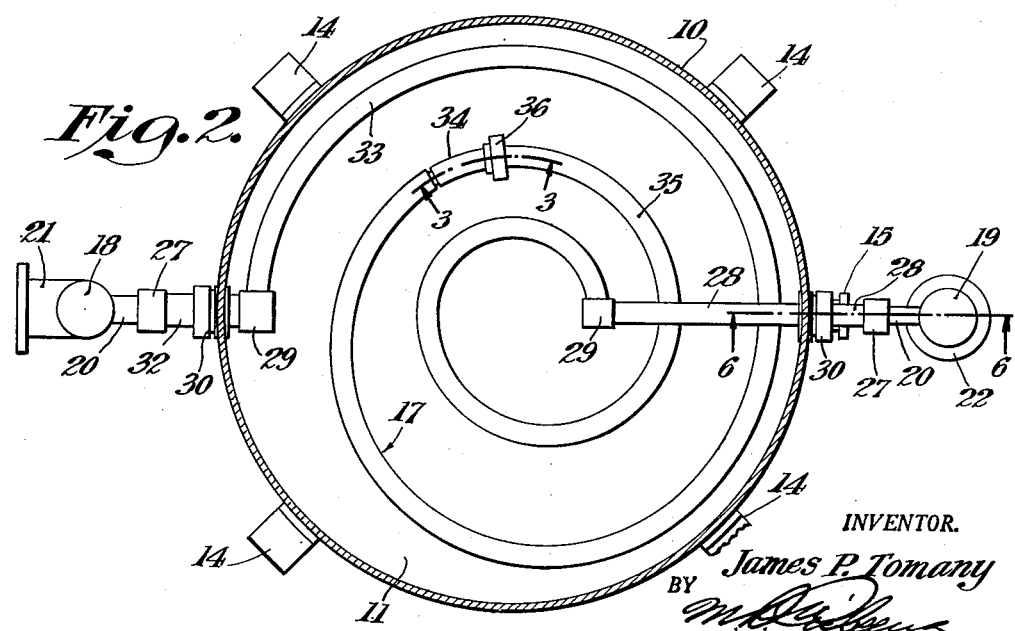
Fig. 2 is a section taken substantially on the plane indicated by the line 2—2 in Fig. 1.

As shown in Fig. 6, an aperture 24 receives the end of each connection 20 which is secured therein by welding 25. The opposite end of each extension 20 is provided with a retaining abutment or collar 26 welded or otherwise rigidly secured thereto and retaining thereon the collar portion 27 of the union by means of which it is connected with the outer threaded end of the coil outlet extension 28 of a coil 17, the extension 28 being connected to the coil end through the fitting 29 (Fig. 2).

By means of the stuffing box 30 rigidly secured in a suitably located aperture in the side-wall 10 of the receptacle, as by welding 31, the outer end of extension 28 is supported in fluid-tight manner for movement inwardly or outwardly of the container or receptacle upon expansion and contraction of the coil 17. If desired, a washer or gasket 26a may be interposed between the above described collar 26 and the end of the coil outlet extension 28 to insure fluid-tight connection between the members 20 and 28.

Each extension 20 of the inlet header 18 is secured in like manner to a coil inlet extension 32 which is similar to the coil outlet extension 28 though of less extent, and each coil inlet extension 32 is secured to the inlet end of each coil 17 through a fitting 29 described above.

Each coil 17 comprises a coil inlet section 33, having a catalyst chamber 34 formed at its inner end, and a coil outlet section 35 which is connected through the above described fitting 29 with the outlet extension 28. The inner ends of the coil sections 33 and 35 are detachably connected by means of the union 36, the details of which are shown in Figs. 3 and 4.

The catalyst chamber 34 is formed integrally in the inner end of the section 33 as described above, the section 33 being annularly crimped at a predetermined distance from its end to form a shoulder 37 defining the inlet end of the catalyst chamber 34. A split ring 38 disposed in the chamber 34 in spaced relation to the shoulder 37 cooperates therewith to secure therebetween a plurality of catalyst screens 39, as shown in Figs. 3 and 4, the nature of the screens 37 being shown in Fig. 5. Since the split ring 38 is adjustable longitudinally of the catalyst chamber 34, the number of catalyst screens on units 39 may be varied as desired.

Likewise, when it is desired to inspect or remove part or all of the screens 39 in a catalyst chamber 34 the union 36 may be disconnected as shown in Fig. 4 and the inner end of the coil section 33 displaced, upwardly or otherwise, to provide access to the then open end of the catalyst chamber 34. While the aforesaid chamber is illustrated as containing screen catalyst it is, of course, to be understood that it may support any other type of catalyst desired.

When the above procedure does not provide sufficient accessibility of the catalyst chamber, or when it is desired to clean the coil sections 33 and 35, the coils 17 may be independently removed. This is done by disconnecting the coil sections 33 and 35 of the coil at the union 36 thereof and thereafter disconnecting the coil inlet extension 32 thereof from its inlet header extension 20 at the connecting union. The coil outlet extension 28 is then disconnected from the outlet header extension 20 at the connecting union. The coil inlet extension 32 and the coil outlet extension 28 may then be displaced axially inwardly through the stuffing boxes 31 and the coil sections 33 and/or 35 and their supported appendages may be removed or replaced. It will thus be seen that the reactor may be readily assembled and/or disassembled with great ease and convenience.

In initiating the catalytic reaction to be carried out in the respective coils 17 of the reactor, heat exchange or heat transfer medium at suitable temperature is introduced through the heat exchange inlet 15, at suitable rate, and circulated over the coils 17 to bring them substantially to reaction temperature. When the desired temperature of the coils 17 has been reached, the medium or material to be treated is supplied through the inlet header 18 to the respective coils 17 and circulated therethrough at a predetermined desired rate in order to secure the desired residence time in the coils 17, and thence outwardly through the outlet header 19 to any suitable collecting station as described above.

Where the reaction is exothermic, the temperature of the circulating heat transfer or heat exchange medium in the reactor will be suitably controlled and the circulation thereof in the reactor will cause thermal energy to be extracted from the coil outlet sections 35 and transferred by indirect heat exchange to the coil inlet sections 33 whereby to bring the incoming material or medium to be treated progressively to the desired reaction temperature during its travel from the inlet header 18 through the coil inlet section 33 to the reaction zone.

As a specific example, operation may be initiated by circulating a suitable heat exchange or heat transfer medium such as "Dowtherm," (a product of the Dow Chemical Company, of Midland, Michigan) at a temperature approximating 750° F. through the reactor, over the coils, and through the outlet 16 at desired rate. When the temperature of the coils 17 is brought to desired temperature, a mixture of air and methanol vapor is introduced to the inlet header 18 at approximately 150° F. During the passage of this mixture of air and methanol vapor from the inlet header to the reaction zone its temperature is raised to a temperature approximating 800° F. which is the desired reaction temperature in the reaction zone or catalyst chamber.

The catalyst comprises a plurality of foraminous silver screens disposed in face to face relation and maintained closely adjacent one another as described above. When the reaction begins, upon contact of the incoming mixture of air and methanol vapor with the foraminous silver catalyst mass, the condition in the reaction zone becomes exothermic and the product of the reaction flowing through the outlet section 35 of each coil 17 tends to rise above the reaction temperature. For this reason, and since it is necessary to maintain the temperature within a narrow range approximating the reaction temperature of approximately 800° F., the temperature of the incoming heat exchange or heat transfer medium, i. e., "Dowtherm" is reduced to such degree that this result is achieved.

The product of the reaction, which is formaldehyde, passes out through the outlet section 35 of each coil 17 through the coil outlet extension thereof and thence through the outlet header 19 to the collecting station.

It is, of course, to be understood that the above description is merely illustrative and in nowise limiting, and that I desire to comprehend within my invention such modifications as are included within the scope of the appended claims.

Having thus clearly described my invention, what I claim as new and desire to secure by Letters Patent is:

1. In a reactor for carrying out catalytic reactions, a fluid-tight shell, means for circulating heat exchange medium through said shell, a plurality of coils forming a plurality of paths for fluid to be treated through said circulating heat transfer medium, each of said coils having a catalyst chamber formed therein and occupying an intermediate portion only of the length of the coil, the coil having substantial portions of the length thereof at opposite sides of said chamber, and a common inlet header outside said shell and connected with the inlet end of each of said coils and with a source of fluid to be reacted with the catalyst.

2. The structure defined in claim 1 wherein each of said coils is provided with a releasable joint adjacent one end of the catalyst chamber thereof providing access to said catalyst chamber upon uncoupling of said joint.

3. In a reactor for carrying out catalytic exothermic reactions, a fluid-tight shell, means for circulating heat exchange medium through said shell, a plurality of spaced substantially flat coils forming a plurality of paths for fluid to be treated through said circulating heat transfer medium, each of said coils having a catalyst chamber formed therein and occupying an intermediate portion only of the length of the coil and shorter than the portions of the coil length at opposite sides thereof, a common inlet header outside said shell and connected with each of said coils and with a source of fluid to be treated, and a common outlet header outside said shell connected with the outlet end of each of said coils.

4. The structure defined in claim 3 wherein each of said coils is provided with a releasable joint adjacent one end of the catalyst chamber thereof providing access to said catalyst chamber upon uncoupling of said joint.

5. A reactor comprising a tube formed of sections in endwise opposed relation, a releasable coupling joining the opposed ends of said tube sections, one of the tube sections having an internal abutment spaced therealong from said coupling, and a removable abutment within said section and adjacent the coupling, said abutments and the portion of the tube therebetween defining a catalyst chamber and the abutments serving to retain therebetween a charge of catalyst in the path of reactants passed through the tube, the catalyst being removable from the tube upon release of the coupling and withdrawal of said removable abutment.

6. A reactor as defined in claim 5 wherein the removable one of said abutments comprises a split resilient ring fitted within the tube, and the tube is crimped circumferentially to form the other of said abutments.

7. A reactor as defined in claim 5 and including means for passing a heat exchange medium in indirect heat exchange relation to the contents of the tube within the reaction chamber and within portions of the tube at opposite sides of said chamber.

8. A reactor as defined in claim 5 and including a shell surrounding the portion of the tube including the reaction chamber and portions of the tube at opposite sides of said chamber, and means for passing a heat exchange medium through said shell in indirect heat exchange relation to the contents of said tube portions.

9. A reactor as defined in claim 5 and including mountings for said tube sections supporting same in operative position independently of said coupling.

10. A reactor comprising a shell, reactor tubes in the form of substantially flat coils in spaced relation within the shell and having inlet ends and outlet ends protruding through apertures in the shell, an inlet manifold and an outlet manifold external to the shell, means detachably connecting said inlet tube ends to said inlet manifold and said outlet tube ends to said outlet manifold for passage of reactants into the tubes and passage of reaction products therefrom, each of said tubes being formed of sections connected at an intermediate point in the length of the coil, releasable couplings providing the connections between the tube sections, each coil having substantial portions of the length thereof at opposite sides of said charge of catalyst therein, means for releasably retaining a charge of catalyst within each tube adjacent said coupling thereof and in the path of the reactants, and means for passing a heat exchange medium through said shell in indirect heat exchange relation to the contents of said coils.

11. In a reactor for conducting a catalytic exothermic reaction, a shell to receive fluid heat exchange medium, a conduit in the form of a coil disposed within the shell for submergence by said medium and formed of sections in endwise opposed relation at an intermediate point in the length of the coil, the coil having an inlet at one end thereof for reactants and an outlet at the opposite end for reaction products, a releasable coupling joining the opposed ends of said coil sections, one of said coil sections having an internal abutment spaced therealong from said coupling and a removable abutment within said section and adjacent said coupling and the portion of the tube between said abutments defining a catalyst chamber and the abutments serving to retain therebetween a charge of catalyst in the path of reactants passed into the coil, the coil having substantial portions of the length thereof disposed at opposite sides of said catalyst chamber for transfer of heat by indirect exchange from the hot reaction products, through said medium, to the reactants enroute to the catalyst chamber.

JAMES P. TOMANY.

REFERENCES CITED

The following references are of record in the file of this patent:

UNITED STATES PATENTS

| Number | Name | Date |
|---|---|---|
| 389,900 | Pratt et al. | Sept. 25, 1888 |
| 413,806 | Kuhn | Oct. 29, 1889 |
| 1,402,336 | Backhaus | Jan. 3, 1922 |
| 1,547,167 | Downs | July 28, 1925 |
| 1,857,308 | Isenberg | May 10, 1932 |
| 2,078,948 | Houdry | May 4, 1937 |